US006781573B1

United States Patent
Honma et al.

(10) Patent No.: US 6,781,573 B1
(45) Date of Patent: Aug. 24, 2004

(54) ERGONOMIC MOUSE

(75) Inventors: Ted T. Honma, Portland, OR (US); Steven L. Pollock, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/557,820

(22) Filed: Apr. 25, 2000

(51) Int. Cl.[7] .................................................. G09G 5/00
(52) U.S. Cl. ....................................... 345/163; 345/157
(58) Field of Search ............................... 345/163–166; D14/402–410

(56) References Cited

U.S. PATENT DOCUMENTS

| | | | | |
|---|---|---|---|---|
| D281,164 S | * | 10/1985 | Kim ........................... D13/168 |
| D287,725 S | * | 1/1987 | Yoshihama ................ D14/407 |
| D354,746 S | * | 1/1995 | Colani et al. ............. D14/409 |
| D370,219 S | * | 5/1996 | Blumer et al. ............ D14/403 |
| D373,999 S | * | 9/1996 | Staats ......................... D14/409 |
| 6,064,371 A | * | 5/2000 | Bunke et al. ............... 345/157 |
| D426,546 S | * | 6/2000 | Diee .......................... D14/403 |
| 6,323,843 B2 | * | 11/2001 | Giles et al. ................. 345/163 |

FOREIGN PATENT DOCUMENTS

JP  05027901 A1 * 2/1993 ........... G06F/3/033

* cited by examiner

*Primary Examiner*—Alexander Eisen
(74) *Attorney, Agent, or Firm*—Marger Johnson & McCollom P.C.

(57) ABSTRACT

An ergonomic mouse is designed to maximize productivity by reducing user fatigue and discomfort. The ergonomic mouse of the present invention includes a housing having a grippable portion that permits a user to grip the mouse substantially under its palm when the mouse rests on a flat surface such as a mouse pad. A concave portion in the housing receives the user's fingers. At least one button is positioned in the concave portion of the housing. The at least one button is actuated by a substantially horizontal force produced by a substantially horizontal motion of the tips of the fingers as the fingers curl in toward the palm.

26 Claims, 2 Drawing Sheets

ERGONOMIC MOUSE

BACKGROUND OF THE INVENTION

1. Field of the Invention

This invention relates to a computer mouse and, more particularly, to an ergonomically designed computer mouse intended to maximize productivity by reducing user fatigue and discomfort.

2. Description of the Prior Art

A peripheral input controller such as a mouse provides an essential key to the functioning and enjoyment of computer software programs by interpreting a user's physical actions and communicating them to the personal computer (PC) in the form of an electronic signal input. A mouse is a so-called relative movement controller. Such controllers generally sense the relative travel of the mouse over a flat surface such as a mouse pad by resolving its motion into a pair of orthogonal vertical and horizontal motion vectors. These vectors, in turn, cause a corresponding proportional relative movement of the screen cursor or object. The new location of the cursor is entirely a function of its old position and the relative movement of the mouse. When the mouse is at rest, so is the screen cursor or object being controlled. The mouse reports the relative distance traversed by it over the mouse pad to the PC in mickeys. Mice of this type are generally utilized by repeatedly stroking or moving the mouse across the mouse pad to move the cursor in the direction of the strokes or movement.

Mice commonly utilize small wheels or trackballs or similar friction devices, the frictional rotation of which on a mouse pad tracks the motion of the mouse. In this manner, relative motion may be detected on any desk, table, or other surface. The surface does not have to be specially treated or encoded and, consequently, mice of this construction have great flexibility by reason of this virtually limitless surface compatibility. And, because of their simple design, mice are generally inexpensive to manufacture.

One of the primary advantages of relative movement controllers is the capability for precise control of the screen cursor's movements. Precise control of the cursor is possible because the distance the cursor moves correspond directly to the distance the relative controller moves. Both the rate and direction of the cursor's movement are in direct correlation to the rate and direction of controller movement.

A drawback is the repetitive nature of the hand movement associated with mouse control—both the hand movement associated with the translation movement of the mouse and button actuation—is inefficient and often causes discomfort in the user's hands and, more particularly, the user's wrists. FIG. 1 is a side view of a conventional mouse 10. The mouse 10 includes a housing 12 that encloses the position tracking means such as the trackball discussed above and related electronics/optics (not shown). The position tracking means is well known by persons skilled in the art and will not be shown or described in detail herein.

The housing 12 has a top end 22 having a generally flat profile. A plurality of buttons including button 16 is placed side by side on the top end 22. A switch 18 is positioned underneath each of the plurality of buttons such that a switch post 20 is aligned in a substantially vertical direction. The switch 18 is electrically coupled to the position tracking means as well as other electronics enclosed within the housing 12 that convert the user's selections into electronic signal input transmissible to the PC. A cable 14 extends from front end 26 electrically coupling the position tracking means to the PC. Alternatively, the position tracking means might be electrically coupled to the PC via wireless means such as infrared signaling. A flat bottom end 24 of mouse 12 rests on a flat surface such as a mouse pad (not shown).

The mouse 10 is used as follows. The user places his hand 30 on the top end 22 of the housing 12. The user's thumb 38 rests on the side 29 in a substantially vertical orientation and the user's fingers 34 extend substantially horizontally over the top end 22. The user's fingertip 36 is positioned above the button 16. The user moves the mouse 10 from one position to another by gripping the mouse 10 between his thumb 38 and little finger (not shown) and pushing. The user actuates the button 16 by pressing the button 16 down using a substantially vertical force V. The vertical force V causes the button 16 to depress the switch post 20 actuating the switch 18.

To exert a force V on the button 16, the finger 34 must move in a substantially vertical direction. This vertical motion can strain the wrist and fatigue the user when the motion is repeated over time. Moreover, because the vertical finger motion is requires the user to lift the finger 34 off the button 16, the mouse is inefficient to use reducing productivity.

Accordingly, a need remains for a computer mouse that is efficient and maximizes productivity by reducing user fatigue and discomfort.

BRIEF DESCRIPTION OF THE DRAWINGS

The foregoing and other objects, features, and advantages of the invention will become more readily apparent from the following detailed description of a preferred embodiment that proceeds with reference to the following drawings.

DETAILED DESCRIPTION OF THE PREFERRED EMBODIMENT

The mouse of the present invention includes a button structure and shape that is specially ergonomically designed with reference to the architecture of the human hand in such a fashion that, at least with respect to the fingers and palm of the hand, only slight gestural finger motion is required for effective, multiple, differentiated button actuation.

Figure 1:
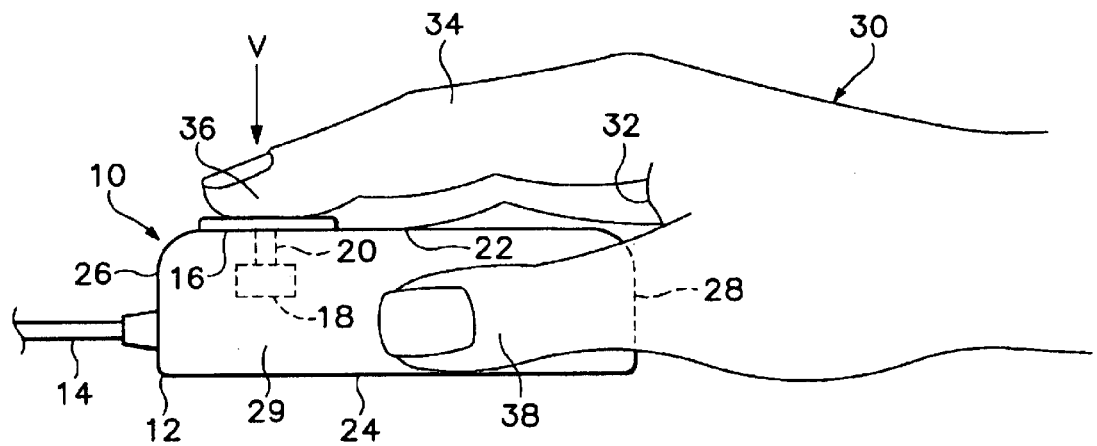
FIG. 1 is a side view of a conventional mouse.
Figure 2:
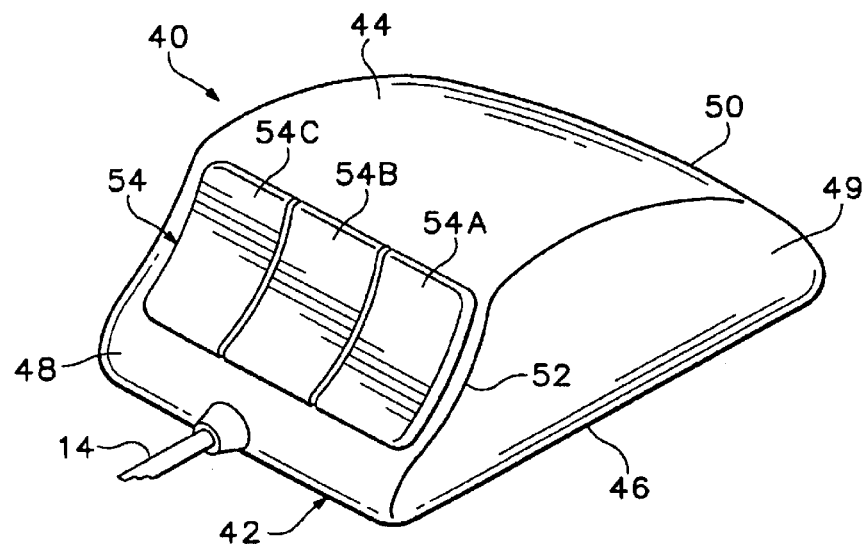
FIG. 2 is a perspective view of the ergonomic mouse of the present invention.
Figure 3:
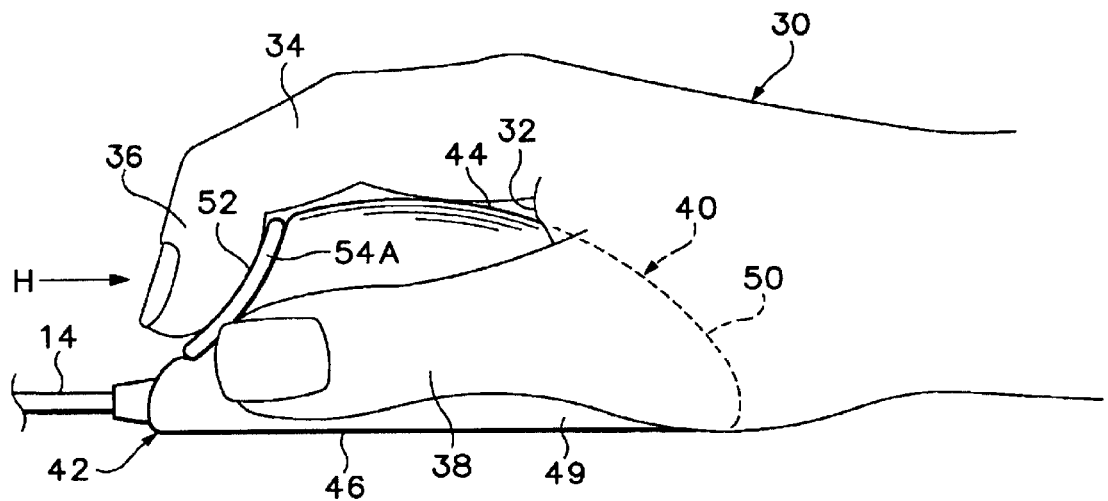
FIG. 3 is a side view of the ergonomic mouse of the present invention.

Referring to FIGS. 2 and 3, the ergonomic mouse 40 of the present invention includes a housing 42 that encloses the position tracking means such as the trackball discussed above and the related electronics/optics. The position tracking means is well known by persons skilled in the art and will not be shown or described in detail herein. The housing 42 preferably includes a grippable portion 44 having a profile that curves or bulges outward. The profile of the grippable portion 44 mimics the natural curvature that exists between the palm 32 and the fingers 34 when the hand 30 is in a grabbing or gripping position. The housing 42 also includes a concave portion 52 located near the front end 48 having a profile that is curved inward toward the back end 50.

A plurality of buttons 54, such as buttons 54A, 54B, and 54C, is placed side by side on the concave portion 52 of the housing 42. Although three buttons 54A, 54B, and 54C are shown in FIG. 2, the number of buttons 54 can vary without departing from the scope and spirit of the present invention.

Figure 4:
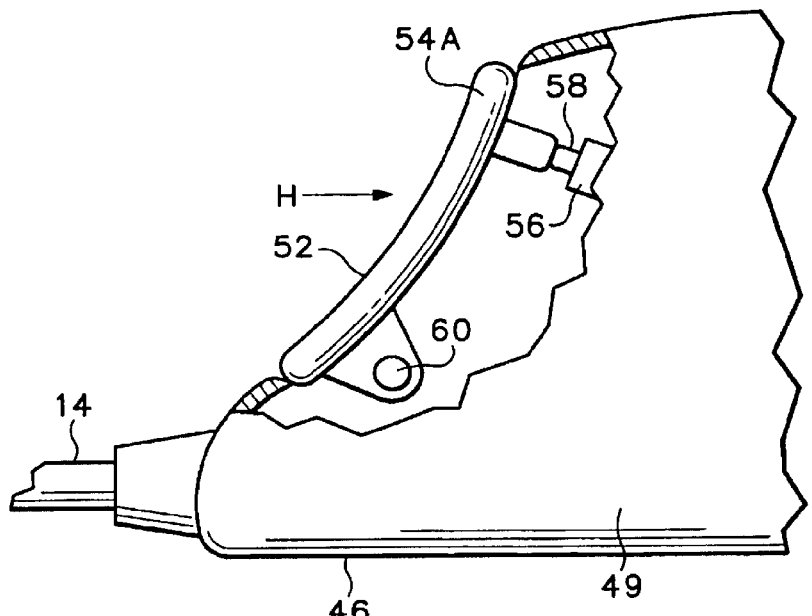
FIG. 4 is an expanded cutaway view of the button placement on the ergonomic mouse of the present invention.

A switch 56 is positioned underneath each of the buttons 54 as best shown in FIG. 4. The switch 56 is positioned such that the switch post 58 is aligned in a substantially horizontal position relative to the bottom side 46 of the mouse 40. The bottom side 46 generally rests on a planar surface such as a mouse pad (not shown). The switch 56 is electrically coupled to the position tracking means as well as other electronics enclosed within the housing 42 that convert the user's selections into electronic signal input transmissible to a PC (not shown). A cable 14 extends from front end 48 electrically coupling the position tracking means to the PC. Alternatively, the position tracking means is electrically coupled to the PC via wireless means such as infrared signaling. A flat bottom side 46 of mouse 40 rests on a flat surface such as a mouse pad (not shown).

Referring to FIG. 3, the grippable portion 44 permits a user to grip the mouse 40 substantially under the user's palm 32 when the mouse 40 sits on the mouse pad (not shown). The thumb 38 rests on the side 49 in a substantially vertical orientation. The user's fingers 34 drape over the concave portion 52 when the user's palm grips or rests on the housing 42. Put differently, with the outwardly curved grippable portion 44 under the user's palm 32, tips 36 of the fingers 34 naturally rest over the buttons 54 positioned in the inwardly curved concave portion 52. The user moves the mouse 40 from one position to another by gripping the grippable portion 44 between its thumb 38 and the thenar region of the palm 32 and pushing.

The tips 36 of the fingers 34 actuate the buttons 54 by applying a substantially horizontal force H to the buttons 54. That is, the fingers 34 tighten their natural inward curl over the buttons 54 when the palm 32 rests or grips the grippable portion 44 applying a mostly horizontal force H to the buttons 54. As best shown in FIG. 4, the force H draws the button 54A, for example, back toward the back end 50 (FIG. 2) causing the button 54A to pivot about its pivot point 60. The pivot motion of the button 54A, in turn, depresses the switch post 58 actuating the switch 56.

By so actuating the buttons 54, user fatigue is eliminated because the overall hand 30 and finger 34 motion during use is minimized. Moreover, user comfort is achieved because the finger motion required to actuate the buttons 54 mimics a natural curling or backward pulling motion of the fingers 34. Finally, user productivity is increased because the overall mouse 40 design is made efficient by requiring a natural gripping position of the hand 30 for moving the mouse and a natural application of a horizontal force by the fingers 34 to actuate the buttons 54.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims

We claim:

1. A computer mouse, comprising:
   a housing having a grippable portion that permits a user to grip the mouse substantially under its palm when the mouse rests on a flat surface;
   a front end of the housing having a concave portion in a vertical longitudinal plane and structured to receive a plurality of a user's fingers, wherein a medial portion of the front end is curved inward toward a back end of the housing;
   at least one button positioned in the concave portion of the housing actuable by the tip of the user's forefinger in a substantially horizontal direction such that the middle portion of the user's forefinger is not in contact with the surface of the housing;
   at least one switch covered by the at least one button, the at least one switch located at a first end of the concave portion and oriented to have a switching action in a substantially horizontal orientation relative to a bottom surface of the mouse; and
   at least one hinge covered by the at least one button, the at least one hinge located at a second end of the concave portion.

2. The computer mouse of claim 1 wherein the at least one button is actuable by a gripping motion of tips of the user's fingers.

3. The computer mouse of claim 2 wherein only the tips of the user's fingers are in contact with the at least one button.

4. The computer mouse of claim 1 including a plurality of buttons positioned side by side in the front end of the housing, the plurality of buttons being individually actuable by a gripping motion of tips of the user's fingers.

5. The computer mouse of claim 4 wherein the plurality of buttons are positioned adjacent to one another with no intervening structure between adjacent buttons.

6. The computer mouse of claim 1 wherein the at least one switch is actuable by a gripping motion of tips of the user's fingers.

7. The computer mouse of claim 1 wherein the front end of the housing is shaped such that when the user grips the housing substantially under its palm, tips of the user's fingers naturally curl toward and rest on the front end.

8. The computer mouse of claim 7 wherein tips of the user's fingers actuate the at least one button by pulling the at least one button in a substantially horizontal direction towards the user's palm.

9. A computer peripheral input device, comprising:
   a housing having a grippable portion and a concavity in a vertical longitudinal plane, the grippable portion permitting a user to grip the mouse substantially under its palm when the device is on a flat surface while a plurality of the user's fingers are free to rest on the concavity;
   at least one button positioned in the concavity of the housing;
   at least one switch covered by the at least one button, the at least one switch located at a first end of the concavity portion and oriented to have a switching action in a substantially horizontal direction relative to a bottom surface of the mouse; and
   at least one pivot covered by the at least one button, the at least one pivot located at a second end of the concavity.

10. The peripheral input device of claim 9 wherein the at least one switch can be actuated by a substantially horizontal curling motion of the user's fingers.

11. The peripheral input device of claim 9 wherein the at least one button comprises a plurality of buttons aligned side by side in the concavity, the plurality of buttons being individually actuable by a substantially horizontal curling motion of the user's fingers.

12. The peripheral input device of claim 11 wherein the plurality of buttons are positioned adjacent to one another with no intervening structure between adjacent buttons.

13. The peripheral input device of claim 9 wherein the concavity is shaped such that when the user grips the housing substantially under its palm, the tips of the user's fingers naturally curl toward and rest on the concavity.

14. The peripheral input device of claim 9 wherein the tips of the user's fingers actuate the at least one switch by pulling the at least one button in a direction substantially toward the user's palm.

15. A method of using a computer mouse, comprising:

gripping a portion of a mouse housing substantially under a user's palm when the mouse sits on a flat surface;

draping a user's fingers on a vertical longitudinal concavity in the mouse housing;

actuating at least one button positioned in the concavity of the housing by curling the user's fingers in towards the concavity such that only the tips of the user's fingers are in contact with the at least one button, wherein actuating the at least one button actuates a switch positioned at a first end of the vertical longitudinal concavity in a switching action that is a substantially horizontal relative to a bottom surface of the mouse, the at least one button also covering a pivot located at a second end of the vertical longitudinal concavity.

16. The method of claim 15 wherein actuating the at least one button comprises pulling the user's fingers in a substantially horizontal direction in towards the user's palm.

17. A computer mouse, comprising:

a housing having a grippable portion;

a portion in the housing having a concave curvature in a vertical longitudinal plane and structured to receive a plurality of a user's fingers, wherein a medial portion of the concave portion is curved inward toward a back end of the housing;

at least one button positioned in the concave curvature of the housing adapted to be actuable by a force applied in a substantially horizontal direction, the at least one button being generally concave in the vertical plane and substantially flat in a horizontal plane;

at least one switch covered by the at least one button, the at least one switch located at a first end of the concave curvature and oriented to have a switching action in a substantially horizontal position relative to a bottom surface of the mouse; and at least one hinge covered by the at least one button, the at least one hinge located at a second end of the concave curvature.

18. The computer mouse of claim 17 wherein the at least one hinge is a pivot point, the at least one button being pivotable on the pivot point back towards a back end of the housing by the force applied to the at least one button in the substantially horizontal direction.

19. The computer mouse of claim 17 including a plurality of buttons positioned side by side in the concave portion of the housing, the plurality of buttons being individually actuable by the force applied in the substantially horizontal direction.

20. An ergonomic mouse comprising:

a housing having a grippable portion that permits a user to grip the mouse substantially under the user's palm when the mouse rests on a flat surface;

a concave portion at a front end of the housing;

one or more buttons positioned in the concave portion;

one or more switches covered by one or more buttons, the one or more switches located at a first end of the concave portion and oriented to have a switching action in a substantially horizontal position relative to a bottom surface of the mouse; and one or more hinges covered by the one or more buttons, the one or more hinges located at a second end of the concave portion.

21. The ergonomic mouse of claim 20 wherein a medial portion of the concave portion is curved inward toward a back end of the housing.

22. The ergonomic mouse of claim 21 wherein the concave portion is curved inward toward a back end of the housing.

23. The ergonomic mouse of claim 20 wherein the one or more buttons is actuable by the user's fingers in a substantially horizontal direction.

24. The ergonomic mouse of claim 20 wherein the one or more buttons are positioned adjacent to one another in the concave portion with no intervening structure between adjacent buttons.

25. An ergonomic mouse, comprising:

a generally rectangular shaped base;

a top surface having a first end with a generally convex shape structured to support a palm of a user, and having a second end with a concave shape in a vertical plane structured to receive one or more fingers of the user;

a series of one or more switch structures, each switch structure including:

a microswitch mounted on the mouse;

a projection mounted on the mouse; and a button having, on a first surface, a receiving portion rotateably coupled to the projection, and a switch plunger structured to depress the microswitch when the button is depressed, the button having a second surface that is substantially concave and shaped to conform to the second end.

26. The ergonomic mouse of claim 25 wherein the switch plunger is oriented relatively perpendicular to the first surface of the button.

\* \* \* \* \*